United States Patent [19]
Ruozi

[11] Patent Number: 5,467,828
[45] Date of Patent: Nov. 21, 1995

[54] HYDRAULICALLY POWERED STALK AND ROOT SHREDDER

[76] Inventor: Aldo Ruozi, 509 E. Brundage La., Bakersfield, Calif. 93387

[21] Appl. No.: 216,972

[22] Filed: Mar. 24, 1994

[51] Int. Cl.⁶ .................................................. A01D 25/04
[52] U.S. Cl. .................. 171/58; 60/456; 171/36
[58] Field of Search .................. 171/36, 26–28, 171/58; 56/503, 504, 60, 95, 16.9, 16.4 D; 60/456; 172/125

[56] References Cited

U.S. PATENT DOCUMENTS

| | | | |
|---|---|---|---|
| 1,821,131 | 9/1931 | Bailey | 171/58 |
| 2,066,864 | 1/1937 | Tucker | 171/58 |
| 2,608,815 | 9/1952 | Graaff | 171/58 |
| 2,704,919 | 3/1955 | Barnes | 56/60 |
| 2,953,209 | 9/1960 | De Marco | 171/58 |
| 4,015,667 | 4/1977 | Ruozi | 172/133 |
| 4,461,341 | 7/1984 | Morrison | 60/456 |
| 4,878,544 | 11/1989 | Barnhart | 171/125 |

FOREIGN PATENT DOCUMENTS 2119216  11/1983  United Kingdom ............ 171/58

*Primary Examiner*—David H. Corbin
*Assistant Examiner*—Spencer Warnick
*Attorney, Agent, or Firm*—Jacobson, Price, Holman & Stern

[57] ABSTRACT

A stalk and root shredder that is provided with rollers which grasp and move stalks and roots upwardly into the path of rotation of blades which shred the stalks and roots and deposits them back onto the ground surface. The stalk and root shredder is hydraulically powered from pump units mounted directly from the tractor by connection with the power take off spline thereby eliminating the use of a power take off shaft. The hydraulic system includes separate hydraulic motors for driving the rollers and blades with the hydraulic system including a cooling arrangement which maintains optimum operating temperatures of the motor and hydraulic fluid. The stalk and root shredder includes a supporting frame and wheels with this structure being quite similar to that illustrated in my prior U.S. Pat. No. 4,015,667 issued Apr. 5, 1977 with the present invention relating to the improvements in the structure and hydraulic operation of the rollers and blade assemblies mounted over the rollers. In one embodiment, the blades rotate about vertical axis and in another embodiment the blades rotate about a transverse horizontal axis and in this embodiment, the blades and rollers are driven from the power take off of the tractor.

16 Claims, 6 Drawing Sheets

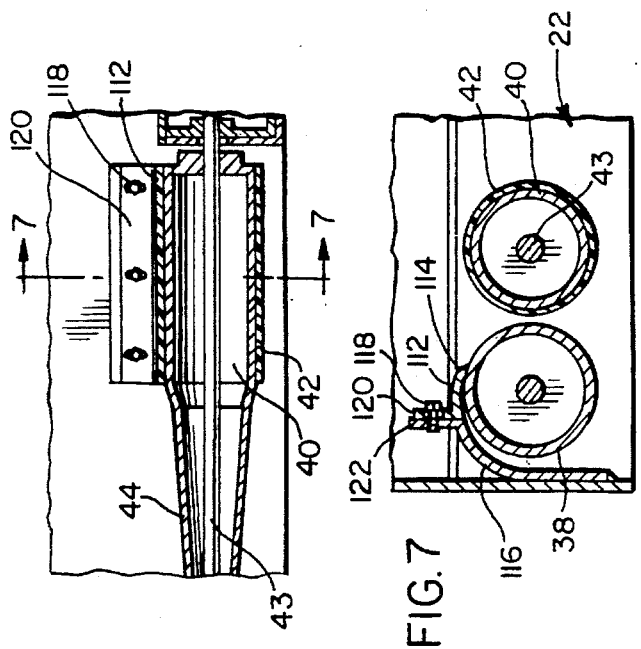
FIG. 6
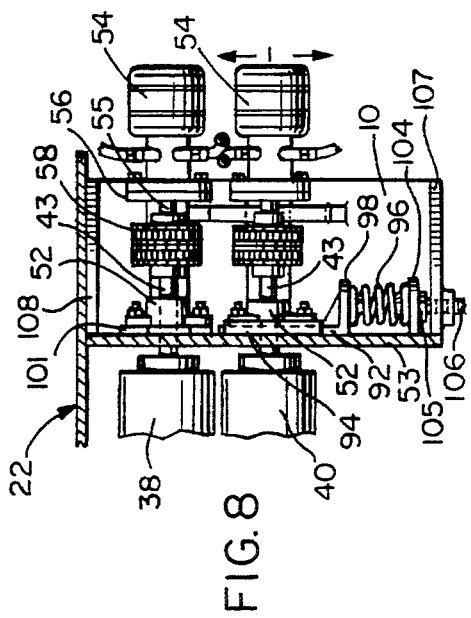
FIG. 7
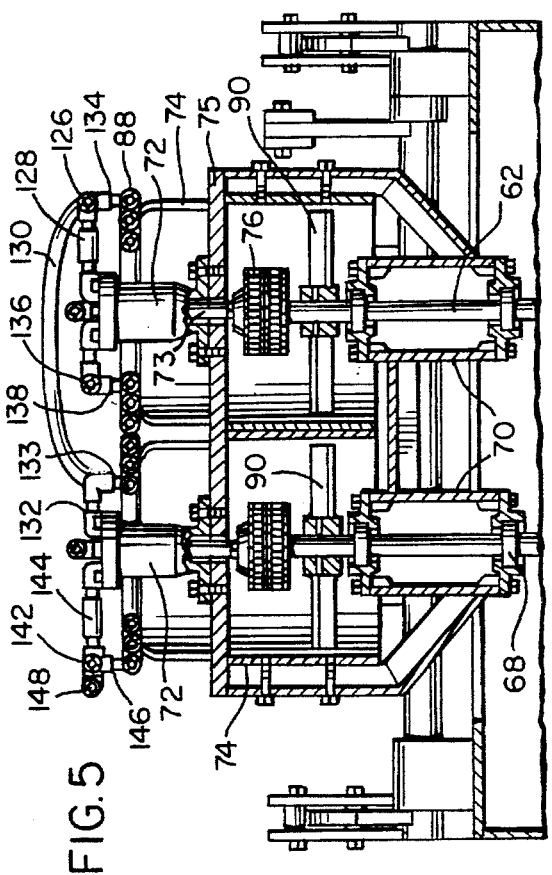
FIG. 8
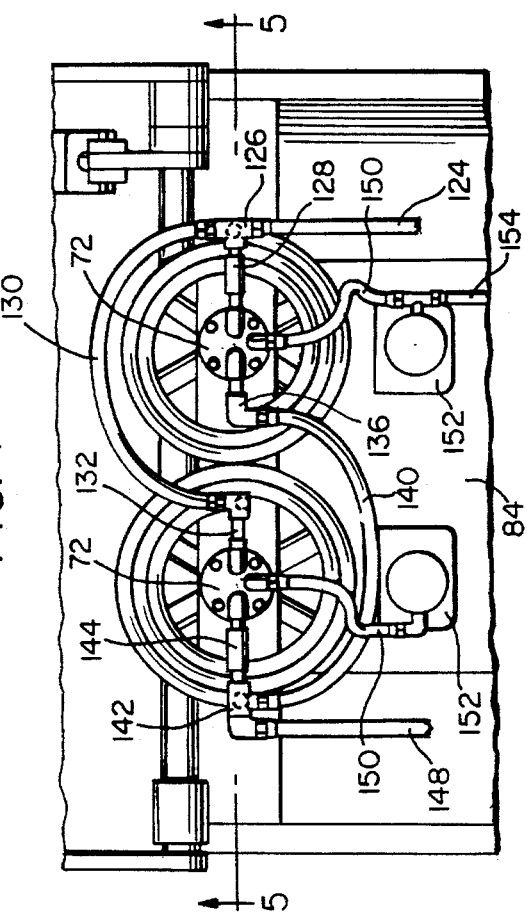
FIG. 4
FIG. 5

HYDRAULICALLY POWERED STALK AND ROOT SHREDDER

BACKGROUND OF THE INVENTION

1. Field of the Invention

A stalk and root shredder that is provided with rollers which grasp and move stalks and roots upwardly into the path of rotation of blades which shred the stalks and roots and deposits them back onto the ground surface. In one embodiment, the stalk and root shredder is hydraulically powered from pump units mounted directly from the tractor and directly connected with the power take off spline thereby eliminating the use of a power take off shaft. The hydraulic system includes separate hydraulic motors for driving the rollers and blades which rotate about vertical axes with the hydraulic system including a cooling arrangement which maintains operating temperatures of the motors and hydraulic fluid within optimum parameters. The stalk and root shredder includes a supporting frame and wheels with this structure being quite similar to that illustrated in my prior U.S. Pat. No. 4,015,667 issued Apr. 5, 1977 with the present invention relating to the improvements in the structure and hydraulic operation of the rollers and blade assemblies mounted over the rollers. In another embodiment, the blades rotate about transverse horizontal axes, with the blades and rollers driven from a power take off shaft connected to the power take off of the tractor through a gear box.

2. Description of the Prior Art

My prior U.S. Pat. No. 4,015,667 issued Apr. 5, 1977 discloses a stalk and root shredder including rollers and blade assemblies associated with the rollers for pulling stalks and roots upwardly from a plant bed and chopping or shredding the stalks and roots and discharging them back onto the ground. The prior patent includes mechanical drive systems obtaining power from a power take off shaft connected with the power take off of a conventional farm tractor. This structure includes various gear boxes, belt drives and the like which require considerable maintenance and upkeep and also present hazardous operating conditions in view of the rotating shafts, pulleys, gears and the like.

The prior patent and the prior art of record in that patent do not disclose a hydraulically driven assembly in which the rollers have a unique structure and mounting arrangement to enable them to be spring biased to facilitate engagement with and lifting of larger stalks and roots systems together with a hydraulic power system including pump units mounted directly to the farm tractor power take off and hydraulic motors connected directly to the shafts for the rollers and blades.

SUMMARY OF THE INVENTION

An object of the present invention is to provide a stalk and root shredder for effectively lifting and shredding stalks and roots of harvested crops or plants and depositing them back onto the surface of the soil with the shredder including a mobile frame with plow structure associated therewith to assist in loosening the stalks and roots together with rollers for lifting the stalks and roots and blade assemblies associated with the rollers for chopping and shredding the stalks and roots.

Another object of the invention is to provide a shredder in accordance with the preceding object in which the rollers and blade assemblies are hydraulically powered by hydraulic motors connected directly to rotating shafts supporting the rollers and blade assemblies with the hydraulic motors receiving pressurized hydraulic fluid from tandem pumps mounted directly on the farm tractor and drivingly connected to the power take off spline shaft.

A further object of the invention is to provide a shredder in accordance with the preceding objects in which the hydraulic power system is provided with cooling coils associated with a housing which encloses the hydraulic motors which drive the blades combined with a fan assembly in the housing associated with the output shaft of the hydraulic motors for circulating cooling air to maintain optimum temperature of hydraulic fluid passing through cooling coils incorporated into the hydraulic flow system.

Still another object of the invention is to provide a shredder in accordance with the preceding object in which the rollers include a combination of a metal roller and plastic coated roller with an adjustable scraper blade associated with the metal roller to prevent buildup of mud or other debris on the metal roller.

A still further object of the invention is to provide a shredder with one embodiment including blades which rotate about a vertical axis and another embodiment including blades which rotate about a transverse horizontal axis and which shred or chop material and throw it towards the rear of the machine through a discharge chute for spreading the material onto the ground surface or for conveying it into a truck or trailer for removal with the embodiment in which the blades rotate about a horizontal axis being driven from a power take off shaft and in this form of the invention, the blades can be used with or without the rollers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a top plan view of the hydraulic motors, cooling coils and housings for the drive motors for the blade assemblies.

FIG. 5 is a transverse, sectional view taken substantially upon a plane passing along section line 5—5 on FIG. 4 illustrating further structural details of the hydraulic drive motors, tubing coil, housing and supporting structure.

FIG. 6 is a fragmental sectional view illustrating the rubber covered roller and the adjustable blade associated with the metal roller.

FIG. 7 is a transverse sectional view taken along section line 7—7 on FIG. 6 illustrating further structure of the rollers and the scraper blade associated with the metal roller.

FIG. 8 is a fragmental, plan view illustrating the drive motors for the rollers with one of the rollers being spring biased towards the other.

DESCRIPTION OF THE PREFERRED EMBODIMENTS

Figure 9:
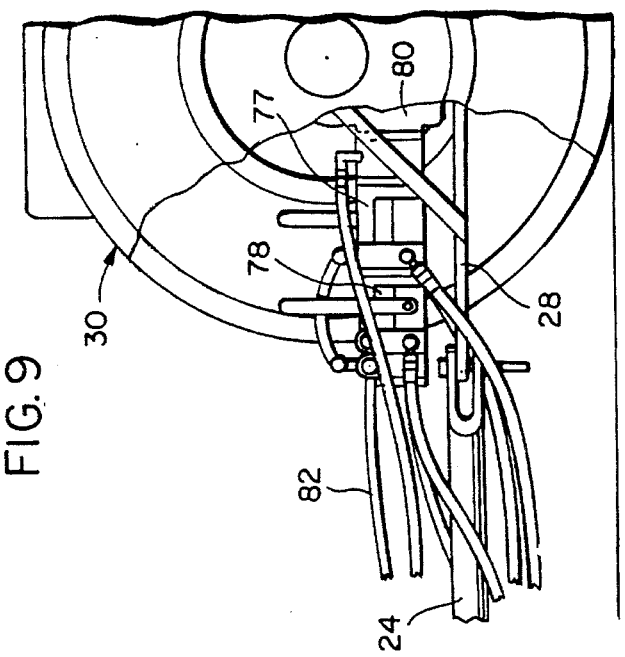
FIG. 9 is a fragmental elevational view illustrating the tandem or piggyback pumps mounted on the tractor and connected to the power take off spline.

Referring to FIGS. 1–10, the stalk and root shredder of the present invention is generally designated by reference numeral 20 and includes a mobile frame generally designated by reference numeral 22 provided with a forwardly extending tongue 24 and supporting wheel and tire assemblies 26 at each side of the frame. The forward end of the tongue 24 is connected to a draw bar 28 on a conventional farm tractor 30 as illustrated in FIG. 9 with the tongue 24 including a forwardly opening U-shaped clevis 32 and a pin 34 pivotally and detachably connecting the tongue to the draw bar in a well known manner.

Figure 2:
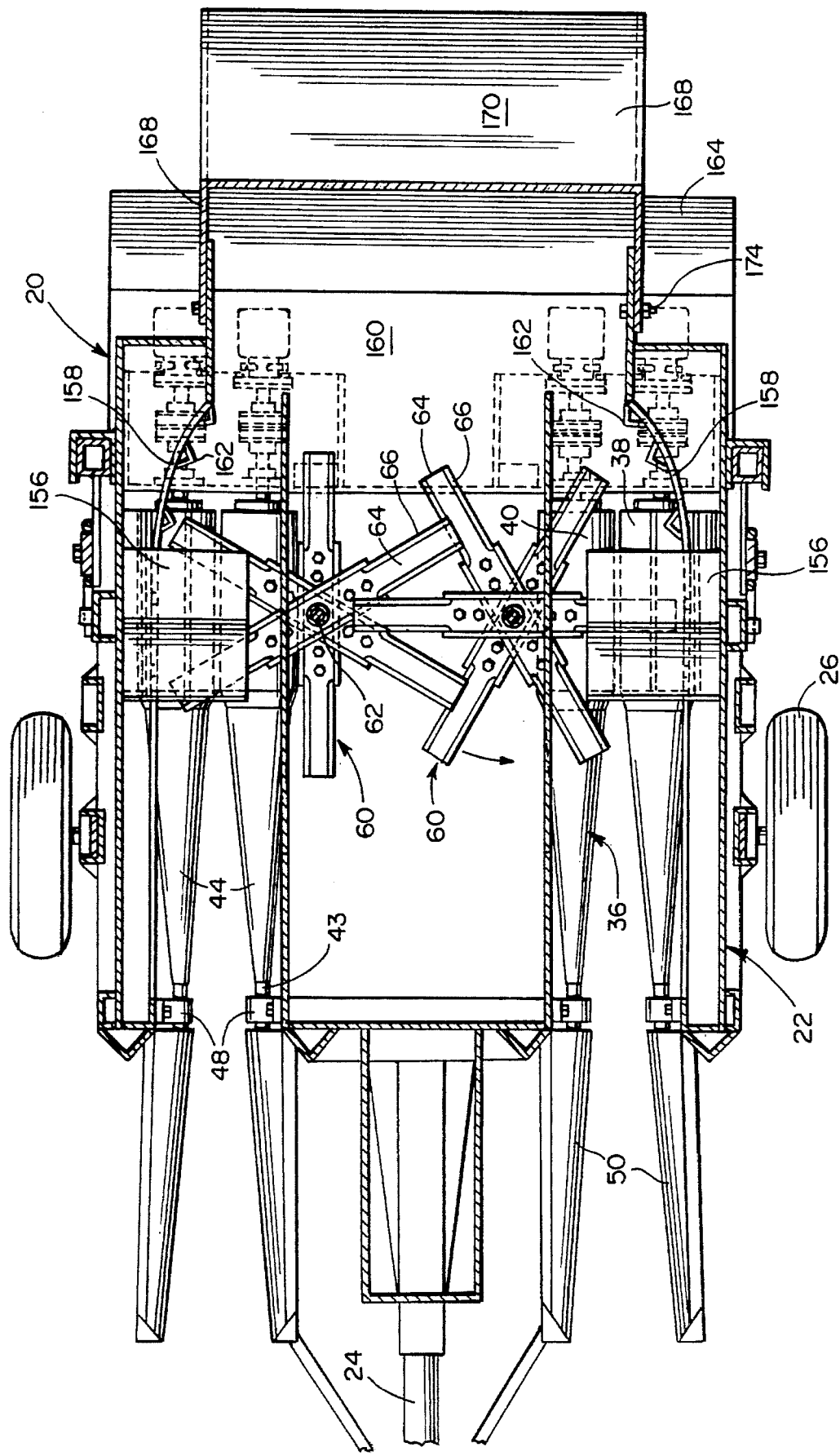
FIG. 2 is a plan sectional view taken along section line 2—2 on FIG. 1 illustrating further details of the orientation of the rollers and blades.

Supported longitudinally adjacent opposite sides of the frame 22, as illustrated in FIG. 2, is a pair of rollers 36 with each pair of rollers including a metal roller 38 and a roller 40 provided with a plastic sleeve 42 as illustrated in FIG. 7. Each of the rollers 38 and 40 includes a supporting shaft 43 and a forwardly extending tapered forward end portion 44 which joins with a cylindrical portion of the roller at a juncture area 46. The forward ends of the rollers are supported in bearings 48 at the forward ends of the tapered portions thereof which are supported from vertical frame components. Extending forwardly from the forward ends of the rollers 38 and 40 is a pair of guide members 50 which extend forwardly and diverge away from each other to form a guide to guide stalks and plants between the rollers 38 and 40 with the guides 50 generally forming a continuation of the inner surfaces of the tapering forward ends 44 of the rollers. The rear end portions of the roller shafts 43 are supported by bearing structures 52 and a transverse vertical frame member 53. Each roller is driven by a hydraulic motor 54 supported from an upstanding bracket 56 with a chain coupler 58 connecting the output shaft 55 of the motor 54 to the roller shafts 43.

Figure 3:
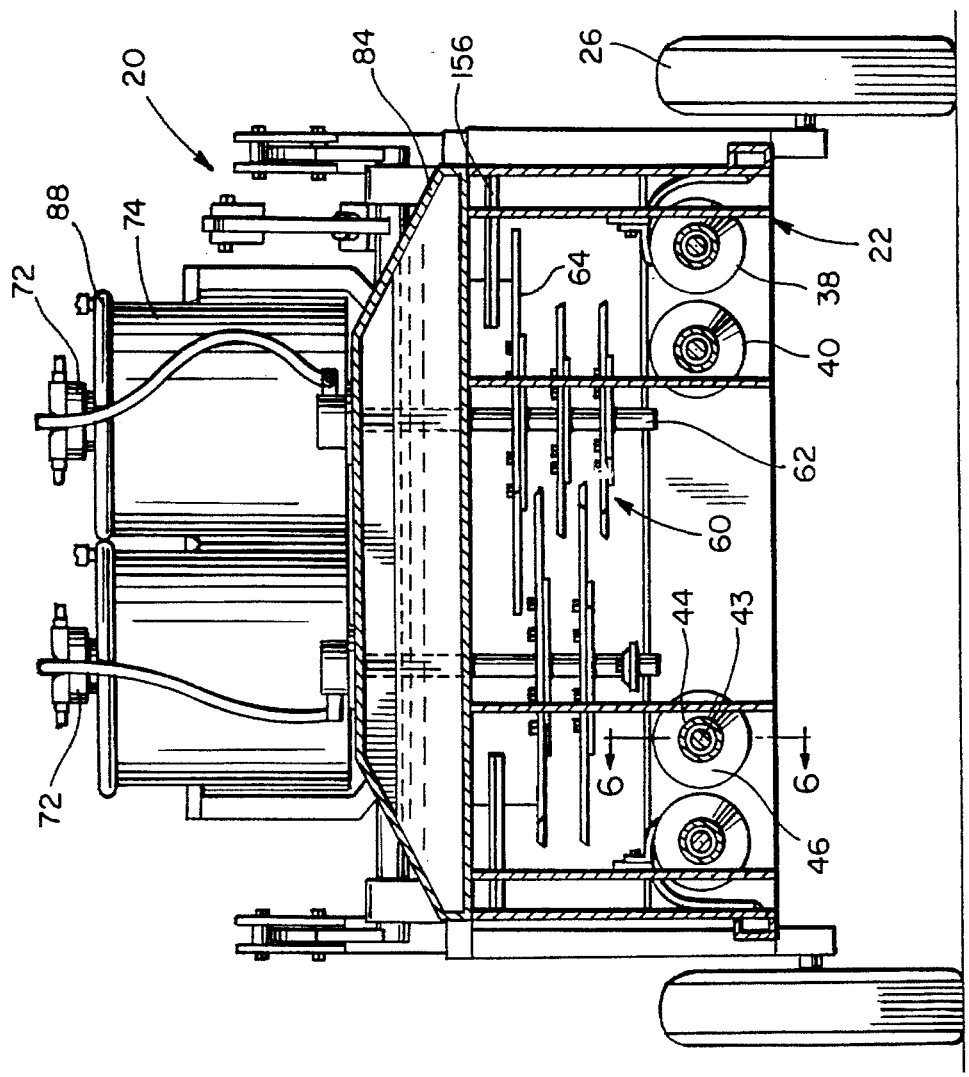
FIG. 3 is a transverse, sectional view taken along section line 3—3 on FIG. 1 illustrating further structural details of the components of the invention.
Figure 11:
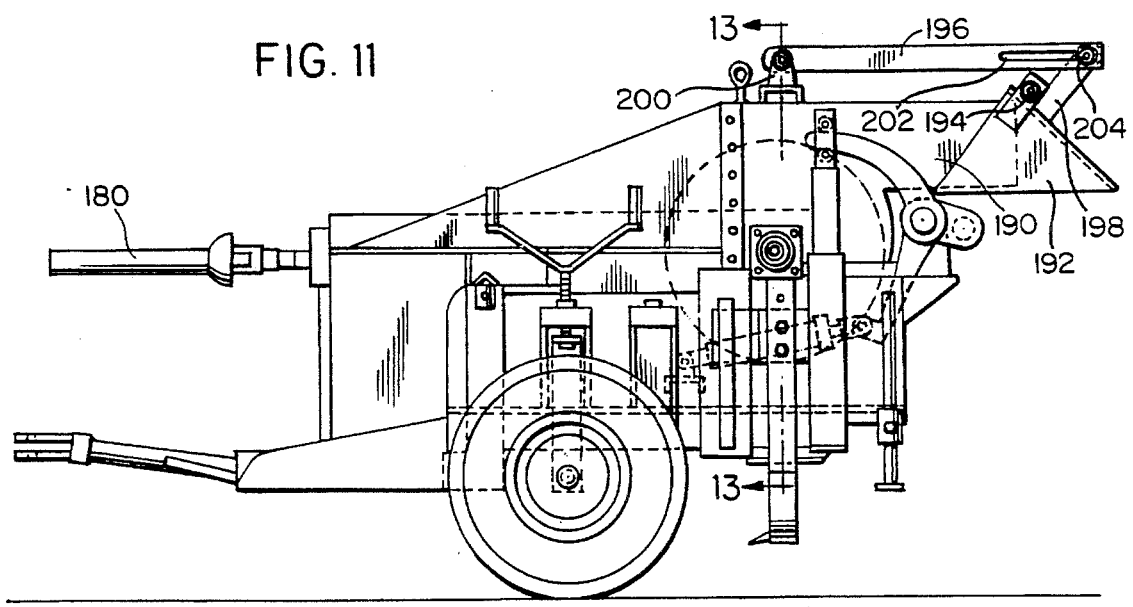
FIG. 11 is a side elevational view of an embodiment of the shredder utilizing rotatable blades that are rotatable about transverse, horizontal axes.
Figure 12:
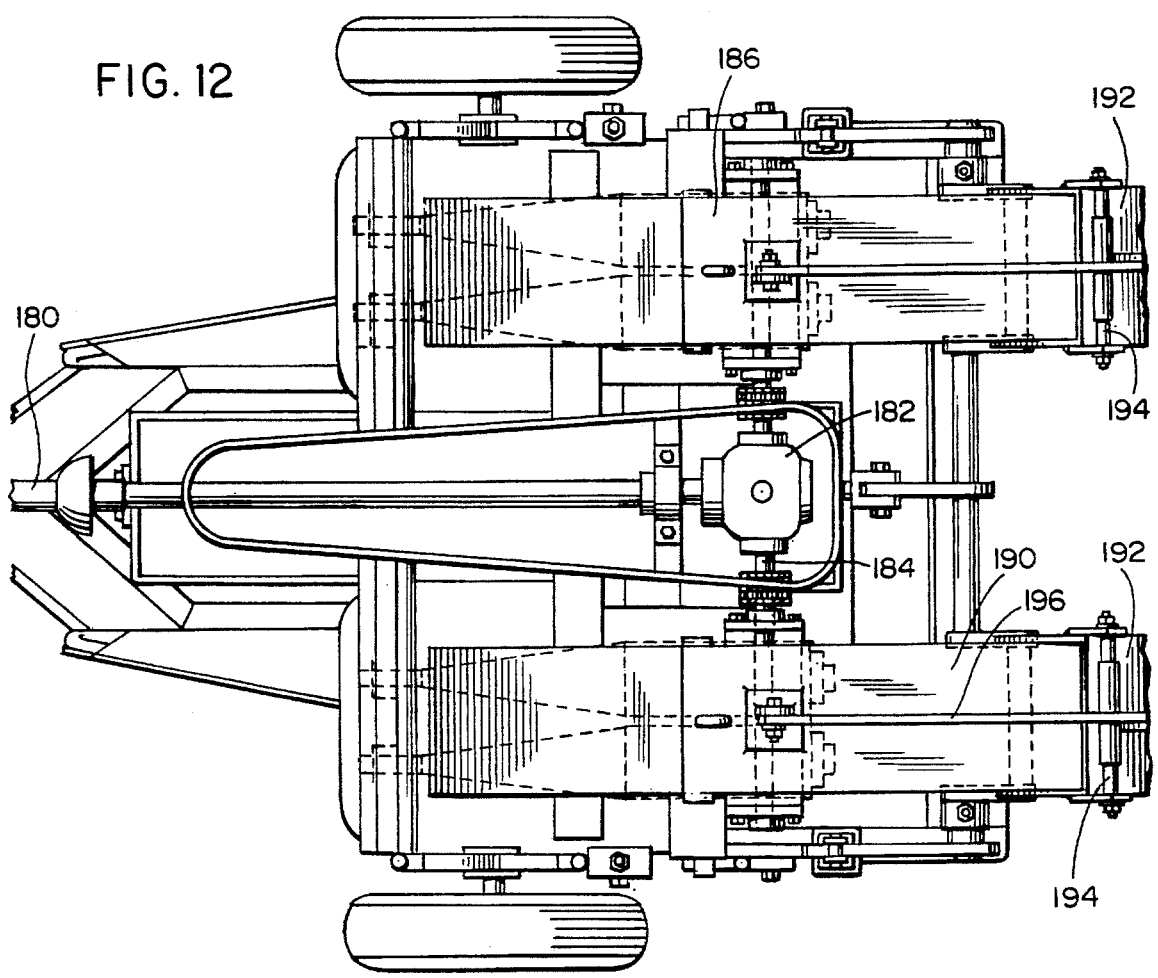
FIG. 12 is a top plan view of the embodiment of the invention illustrated in FIG. 11.
Figure 13:
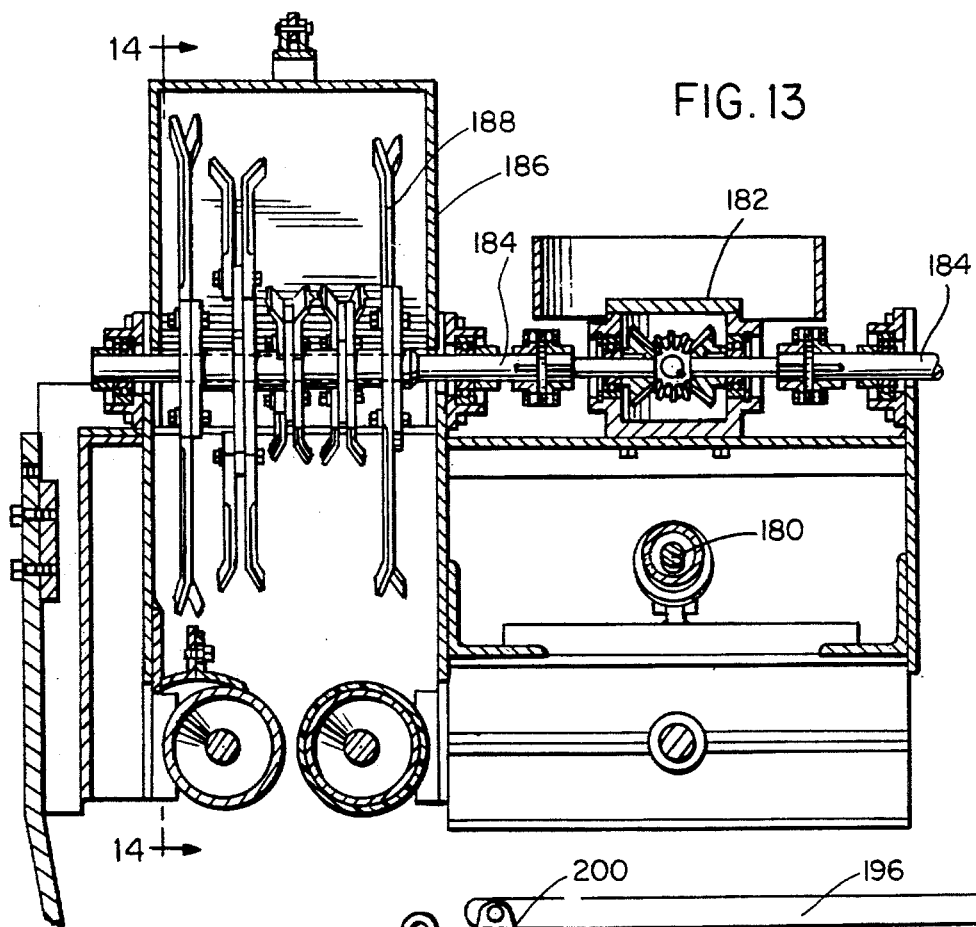
FIG. 13 is a transverse sectional view taken along section line 13—13 on FIG. 11.

Positioned above the rollers 38 and 40 is a pair of blade assemblies 60 each of which is associated with a pair of rollers 36 with each blade assembly 60 including a vertical shaft 62 supporting a plurality of transversely extending rotatable blades 64 with the number of blades preferably being three thus providing six radially extending blade elements each having sharpened edges 66. As illustrated in FIG. 3, the sharpened edges of the blades extend into overlying relation to the rollers 38 and 40 in order to shred and chop any roots, stalks or plants which are lifted upwardly between the rollers during forward movement of the shredder. Each blade assembly 60 is oriented vertically and the shaft 62 is supported from bearings 68 in a vertical housing 70 open at the top and bottom. The shafts 62 are each driven from a hydraulic motor 72 supported in the housing 74 on a transverse plate 75. A chain coupler 76, which is a double sprocket chain engaging a pair of sprocket gears with one sprocket gear being mounted on the shaft 62 and the other sprocket gear being mounted on the output shaft 73 of the hydraulic motor 72. The hydraulic motors 72 for driving the blades and the hydraulic motors 54 for driving the rollers are powered by a pair of tandem or piggyback pumps 77 and 78 which are supported directly from the tractor 30 and connected to the power take off housing 80 of the tractor with the pumps 77 and 78 being piggyback arranged and drivingly connected directly to the power take off spline in the tractor. Hydraulic hoses 82 are connected with the pumps and the motors and a supply tank 84 which is mounted at the upper forward portion of the frame 22 of the shredder 20.

Figure 1:
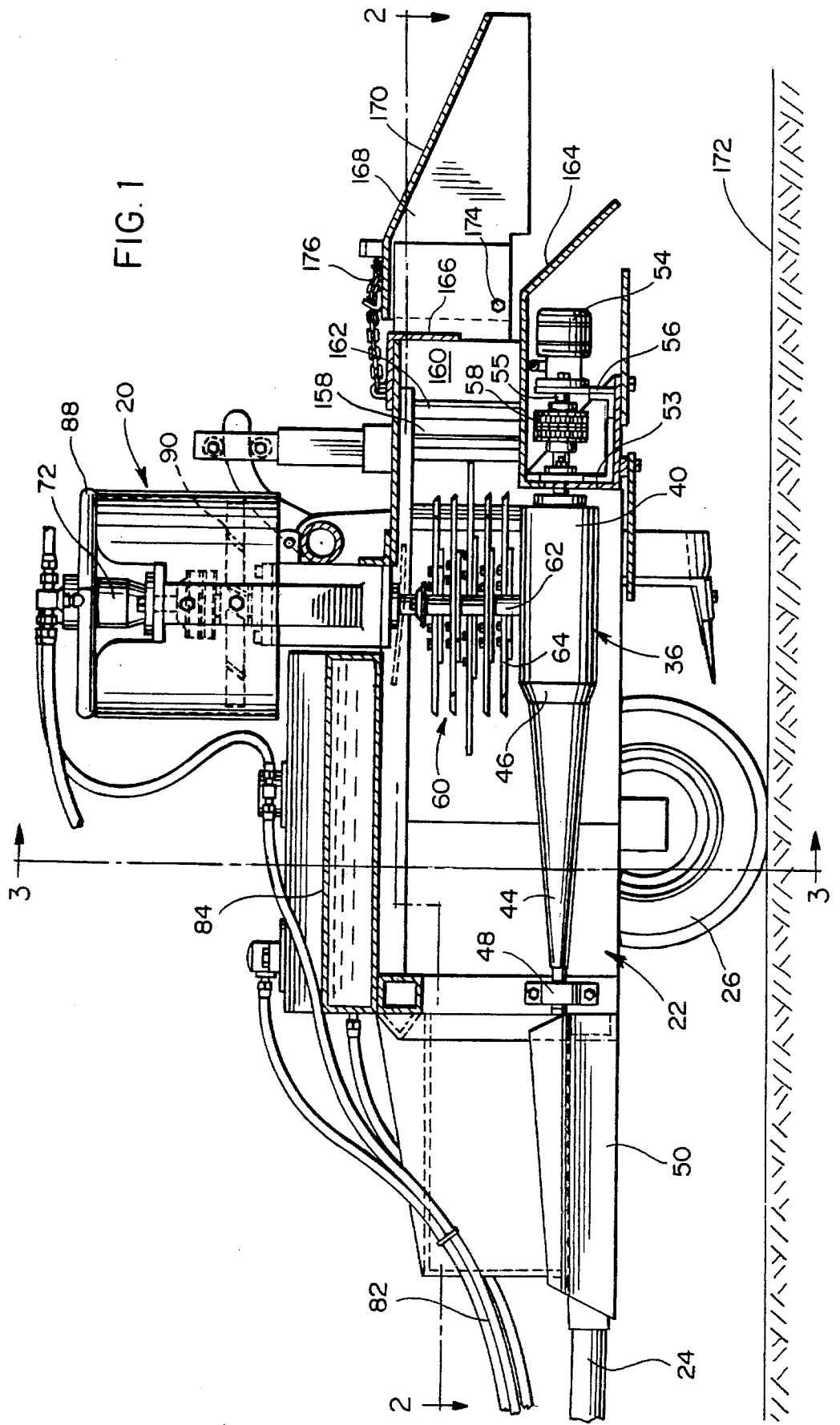
FIG. 1 is a longitudinal, sectional view of the shredder illustrating the orientation of the components which form the improvements over my prior patent.

The piggyback pumps are variable speed piston type and the pump assembly is hooked directly into power take off spline of the tractor rendering the drive arrangement much less hazardous than previously used rotating power take off shafts. The front pump 77 operates the blade assemblies 60 while the rear pump 78 operates the rollers 36 with both pumps being reversible and appropriate controls can be connected to controls in the tractor cab. The oil tank or reservoir 84 has sufficient capacity to supply hydraulic fluid to the various pumps and motors and forms a top portion of the shredder frame as illustrated in FIGS. 1 and 3.

The blade assemblies 60 are driven by the hydraulic motors 72 which are piston type hydraulic motors with the shafts extending between the motors and blade assemblies being connected by chain couplers as illustrated in FIG. 4. The motors 72 are enclosed by the cylindrical housing 74 which is open on the top and bottom and spaced from the motors 72 as illustrated in FIG. 5. The hydraulic system includes spiral coil tubing 88 connected with hoses 82. Hydraulic oil flows through the tubing which is wrapped around spirally above and interiorly of the upper end of the housing wall generally in concentric relation to the motor 72 as illustrated in FIG. 5. A fan assembly in the form of a six bladed fan 90 mounted on the shaft 62 adjacent the bottom of housing 74 draws air down from the top of the housing 74 around the motor 72 and coil tubing 88 to keep the motor cool and cool the hydraulic oil to optimum operating temperature. The association of the fan 90, housing 74 and tubing 88 is illustrated in several figures of the drawings including FIG. 1 and FIG. 5.

The same shafts 62 which hold and operate the shredding blade assemblies are connected to the hydraulic motors 72 and fans 90 for operation of the fans for cooling the motor and hydraulic oil. This eliminates the necessity of an auxiliary cooler or radiator. The oil tank 84 and pumps 77 and 78 and motors 54 and 72 may be provided with suitable filters to maintain the oil in clean condition for effective operation. The fan blades may have a diameter of approximately 16 inches with the diameter of the housing 74 being slightly larger than the fan operating diameter.

Figure 10:
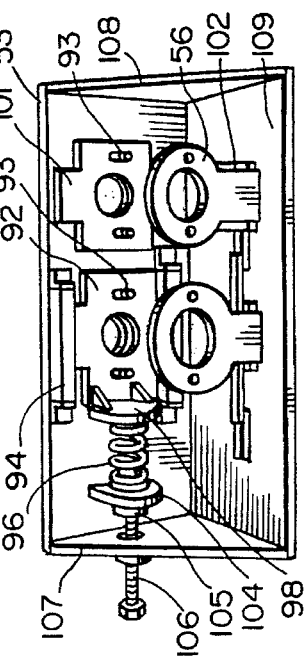
FIG. 10 is a perspective view illustrating further structural details of the spring biased mounting for one of the rollers.

The rollers 36 are movably mounted. As illustrated in FIGS. 7, 8 and 10, the rollers are spring biased towards each other which allows the inside roller 40 of each pair of rollers to move away from the outside roller 38 thus allowing larger material to pass between the rollers and up into the cutting chamber occupied by the blade assemblies 60. Thus, the stalk and root shredder can operate in connection with various size root systems and various size plants. The hydraulic motors 54 which drive the rollers are of the piston type and are connected to each roller shaft 43 at the rear of the machine by chain couplers 58. The two rollers 38 on the machine that are outboard, next to the frame, have drums made of smooth or roughened steel. The two rollers on the inside have smooth replaceable polyurethane sleeves 42 on the drums 40. These sleeves can be made of various resilient materials including polyurethane, rubber and the like. The steel and polyurethane sleeved rollers each have the same diameter of approximately 8⅛ inches. However, the steel roller is bolted solid on the frame side and the spring loaded polyurethane roller is on the inside.

The polyurethane roller 40, shaft 43 and bearing 52 are slidably supported by a mounting plate 92 that is slidable on horizontal guide strips 94 secured to support plate 53 as illustrated in FIG. 10. The plate 92 is biased inwardly by a spring 96 engaging a circular plate 98 at its inner end which is connected to mounting plate 92 and reinforced by gussets 100. The other end of spring 96 engages a lug 104 slidable along plate 53. The lug 104 includes a seat 105 for an adjustment bolt 106 which extends through end plate 107 having a threaded nut welded thereto. Plate 107 together with end plate 108 forms gussets between plate 53 and a bottom plate 109. The mounting plate 92 and a reinforcing plate 101 on plate 53 include stud bolts 93 which supports bearings 52 for shafts 43 and 55. The plates 92 and 101 include an extension 102 extending along the surface of plate 109 with extension 102 on plate 92 being guided by guide straps 110. The extensions 102 support motor brackets 56.

The rollers 38 and 40, being hydraulically driven can be reversed from the cab of the tractor which aids in unclogging the rollers and machine and eliminates the use of a clutch that is subject to wear. If the machine becomes overloaded, there is no damage to the machine as the mechanism simply stops when overloaded thereby providing a much safer operation and dramatically reducing operating costs.

In very wet or heavy soils, mud and shredded residue tends to build up on the rollers and inside the cutting chamber of the machine. By placing steel rollers against polyurethane rollers, self cleaning of the rollers is facilitated as mud will not stick to polyurethane. However, the steel rollers will continue to have a tendency to have mud or other debris build up thereon. In order to solve this problem, an adjustable scraper blade 112 is associated with the roller 38 as illustrated in FIG. 7 with the scraper blade having a bevelled edge 114 adjacent roller 38 to remove mud or other material from the roller 38. The blade 112 is attached to a supporting bracket 116 by bolts 118 extending through a slotted flange 120 on blade 112 to enable adjustment of the blade 112 in relation to the roller 38. The bracket 116 is supported from the frame in a suitable manner and includes a flange 122 receiving the bolts 118. This structure enables built up mud and other residue to be scraped from the steel roller and helps to keep the inside of the cutting chamber clear of debris. The use of steel rollers on the outside and the polyurethane covered rollers on the inside eliminates shredded residue lodging between the frame and the outside roller which would occur if both rollers were constructed of polyurethane. Constructing the outer rollers of steel and utilizing the adjustable scraper blade retains the rollers in a clean condition and maintains the cutting chamber substantially clear of mud and debris.

FIGS. 4 and 5 illustrate the hydraulic supply and return for the blade and fan motors 72 with the oil supply being through supply hose 124 connected with hose 82 from pump 77 with the supply hose connected to a T-fitting 126 having a branch connected to the right motor 72 as illustrated in FIG. 4 though a branch line 128 and another branch connected to a supply hose 130 which curls around the housing and connects with the other motor 72 through a coupling and branch line 132 with the coupling also connected to cooling coil 88 for the left hand motor 72 by a depending branch line 133. The fitting 126 also includes a depending branch line 34 supplying hydraulic fluid to the cooling coil 88 for the right hand motor 72. The right motor 72 includes a return fitting and branch line 136 connected with coil 88 for the right hand motor through branch line 138 with a hose 140 extending around the left hand motor 72 to a return fitting 142 connected to a return branch line 144 from the left hand motor and a branch line 146 from coil 88 and thus to a return hose 148 back to the pump 77. Also, each motor 72 includes a drain hose 150 which extends into the oil tank 84 through a filter 152. A similar return hose 154 extends from the pumps back to the tank 84 for draining all of the fluid back into the tank.

A shield plate 156 above each blade assembly 62 is connected to a side wall or frame and coacts with the blades 64 and rollers to more effectively chop stalks and guide the chopped material to the rear for discharge. Also, as shown in FIG. 2, the side walls 158 are inwardly curved to join with a rear discharge area 160 with the inner surface of the curved walls having vertically disposed ridges 162 mounted thereon which cooperate with the blades 64 to more effectively chop stalks moved upwardly by rollers 38 and 40. The discharge area 160 includes a downwardly inclined bottom wall or chute 164, a vertical baffle 166 spaced above bottom wall 164. An inverted channel shaped deflector 168 extends rearwardly above the bottom wall and includes a downwardly inclined top wall 170 to deflect chopped stalks toward the ground surface 172. The deflector 168 is pivotally supported by pivot bolts 174 and a chain 176 is engaged with the top of the deflector to vary its angular relation to the ground surface.

Figure 14:
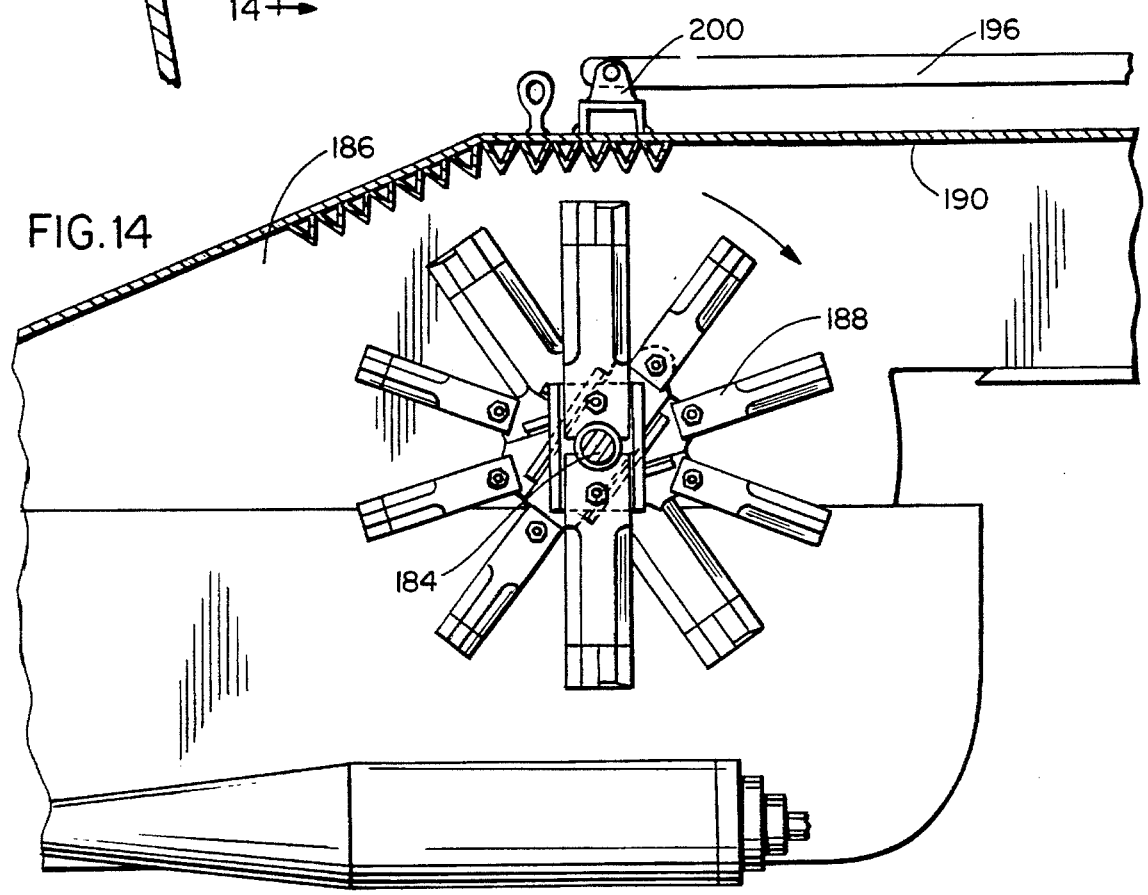
FIG. 14 is a vertical sectional view taken along section line 14—14 on FIG. 13.

FIGS. 11–14 disclose improvements that have been made in the embodiment of the invention utilizing generally vertical rotary blades or flails which rotate about a traverse horizontal axis and rotated in a manner to pickup material and shred it and throw it toward the rear of the machine through a discharge chute back onto the ground surface. In this embodiment of the invention, the device is driven from a power take off shaft 180 that extends into a gear box 182 having oppositely disposed, laterally extending output shafts 184 which extend into housings 186 and support the vertically disposed blades 188 on the shaft 184 as illustrated in FIG. 14. Each of the blades or flails 188 oriented in the housing 186 discharges material to the rear as indicated by the arrow in FIG. 14 where it enters a chute 190 having a rear deflector 192 which deflects the material onto the ground surface or onto a conveyor or into a truck or the like. The deflector 192 is pivotally supported by a pivot rod 194 and an adjustment link 196 is attached to the deflector 192 through a bracket 198 spaced from the pivot rod 194. The other end of the link 196 is connected pivotally to a bracket 200 on the housing 186 and the link 196 includes an elongated slot 202 therein for slidably receiving an anchor or clamp bolt 204 thereby enabling adjustment of the angular position of the deflector 192 in relation to the rear of the housing 186.

In this embodiment of the invention, the rollers are the same as in FIGS. 1–10 and are optional in this unit inasmuch as the flail blades 188 can function without the lift rollers. The remainder of the frame structure, supporting wheels and adjustment features for the wheels and plows are the same as in my prior U.S. Pat. No. 4,015,667.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A stalk and root shredder comprising a frame moveable along a path of travel, a pair of longitudinally extending, parallel, driven lifting roller rotatably mounted on the frame and extending longitudinally thereof, guide means forwardly of the rollers for guiding stalks, roots and similar material between the rollers, a blade assembly mounted on the frame above the rollers and operatively associated with the rollers for cutting material lifted by the rollers, each of the rollers comprising a cylindrical portion and a forward tapering end portion, said cylindrical portions being generally parallel and closely spaced to grip and lift stalks, roots and similar material received between the rollers, means supporting one of the rollers for spring biased movement toward and away from the other of the rollers to enable the distance between the rollers to vary for lifting different size roots, stalks and similar material, said rollers being hydraulically powered from the end thereof remote from the tapered end, said means supporting one of the rollers for spring biased movement including a supporting plate, a bearing structure on said supporting plate, said roller that is spring biased including a shaft received in the bearing structure, said plate including guide means enabling the bearing structure to move laterally, spring means resisting such lateral movement to spring bias the movable roller towards the stationarily supported roller, each roller being hydraulically driven by a hydraulic motor capable of being reversed to unclog the rollers, said blade assembly including a plurality of horizontally disposed, vertically spaced blades mounted on a vertical shaft, bearing means supporting the vertical shaft and hydraulic shaft motor connected to and driving the vertical shaft, said hydraulic motor being positioned within a large housing open at the top and bottom, hydraulic tubing connected to said shaft motor and being spirally disposed at the open top of the housing, a fan mounted on said shaft between the blades and shaft motor to circulate air upwardly through the housing and over the tubing to cool the motor driving said shaft and cool the hydraulic fluid for maintaining optimum operating conditions.

2. The shredder as defined in claim 1 wherein one of said rollers is provided with a metallic external surface, the other of said rollers including a resilient external surface and a scraper blade associated with the roller having the metallic surface for removing mud and debris and the like from the metallic surface of the roller.

3. The shredder as defined in claim 1 wherein said hydraulic tubing is connected to a pump mounted on a farm tractor and connected directly to a power take off spline of the farm tractor, said frame including a towing tongue extending forwardly therefrom and attached to a draw bar of the farm tractor.

4. The shredder as defined in claim 3 together with a supply tank for hydraulic fluid being mounted on the frame adjacent the shaft motor and housing and extending transversely of the frame with the tank being communicated with the pump and shaft motor.

5. The shredder as defined in claim 4 together with a second pump mounted in piggyback relation to the pump supplying hydraulic fluid to the shaft motor, said second pump supplying hydraulic fluid to the hydraulic motor driving the rollers.

6. The shredder as defined in claim 1 together with an adjustable chute rearwardly of the blades for discharging material onto the ground surface or into a receptacle.

7. A stalk and root shredder comprising a frame moveable along a path of travel, a pair of longitudinally extending, parallel, driven lifting rollers rotatably mounted on the frame and extending longitudinally thereof, guide means forwardly of the rollers for guiding material between the rollers, a blade assembly mounted on the frame over the rollers and operatively associated with the rollers for cutting stalks and roots lifted by the rollers, said blade assembly comprising a plurality of horizontally disposed, vertically spaced blades mounted on a vertical shaft, bearing means supporting the vertical shaft and a hydraulic motor driving an upper end of the vertical shaft, said hydraulic shaft driving motor being positioned within a large housing open at the top and bottom, hydraulic tubing connected to said motor and being spirally disposed at the open top of the housing, a fan mounted on said shaft between the blades and shaft driving motor to circulate air through the housing and past the tubing to cool the shaft driving motor and cool the hydraulic fluid for maintaining optimum operating conditions.

8. The shredder as defined in claim 7 wherein hydraulic supply hoses are connected between the hydraulic tubing and a pump mounted on a farm tractor, said pump being connected directly to a power take off spline on the farm tractor, said frame including a towing tongue extending forwardly therefrom and attached to a draw bar of a farm tractor.

9. The shredder as defined in claim 7 wherein one of said rollers is provided with a metallic external surface, the other of said rollers including a resilient external surface and a scraper blade associated with the roller having the metallic surface for removing mud and debris from the metallic surface of the roller.

10. The shredder as defined in claim 7 wherein said rollers are hydraulically powered by hydraulic motor from the end thereof remote from the guide means, and means supporting a rearward end of one of the rollers for spring biased movement including a supporting plate, a bearing structure on said supporting plate, said roller that is spring biased including a shaft received in the bearing structure, said plate including guide means enabling the bearing structure to move laterally, spring means resisting such lateral movement to spring bias the movable roller towards the stationarily supported roller.

11. The shredder as defined in claim 10 together with a second pump mounted in piggyback relation to the pump supplying hydraulic fluid to the shaft driving motor, said second pump supplying hydraulic fluid to the hydraulic motors driving the rollers and an adjustable chute rearwardly of the blades for discharging material onto the ground surface or into a receptacle.

12. A stalk and root shredder comprising a frame moveable along a path of travel, a pair of longitudinally extending, parallel, closely spaced, driven lifting rollers rotatably mounted on the frame for receiving, gripping and lifting stalks, roots and similar material received between the rollers as the frame moves along a path of travel, said rollers having a tapered forward end, a blade assembly mounted on the frame above the rollers and operatively associated with the rollers for shredding stalks, roots and similar material lifted by the rollers, said blade assembly including a plurality of horizontally disposed, vertically spaced blades mounted on a vertical shaft, bearing means supporting the vertical shaft and a hydraulic motor driving an upper end of the vertical shaft, a vertically disposed housing mounted on said frame, said housing being open at the top and bottom, said housing having a portion of the shaft above the blades positioned therein, said hydraulic motor being supported at an upper end of said housing, hydraulic tubing connected to said hydraulic motor for supplying driving hydraulic fluid to said motor and discharge of hydraulic fluid from said motor, said tubing spirally disposed at the open top of the housing, a fan mounted on said shaft within the housing below the tubing and motor to circulate air through the housing and over the tubing and motor to cool the motor and cool the hydraulic fluid for maintaining optimum operating conditions.

13. The shredder as defined in claim 12 wherein said hydraulic tubing is connected to a pump mounted on a tractor, said pump being connected to a power take off on the tractor.

14. The shredder as defined in claim 12 wherein one of said rollers is provided with a metallic external surface, the other of said rollers including a removable resilient external sleeve and a scraper blade associated with the roller having the metallic surface for removing mud and debris from the metallic surface of the roller.

15. The shredder as defined in claim 12 wherein said rollers are hydraulically powered from the end thereof remote from the tapered end, and means supporting at least one of the rollers for spring biased lateral movement of the powered end of the roller including a supporting plate, a bearing structure on said supporting plate, said spring biased roller including a shaft having a rearward end received in the bearing structure, said plate including guide means enabling the bearing structure to move laterally, spring means resisting such lateral movement to spring bias the movable roller towards a stationarily supported roller an independent hydraulic motor drivingly connected to the rearward end of each roller shaft for lateral movement with said one shaft when the rearward ends of the rollers are moved laterally apart by stalks, roots and similar material received between the rollers.

16. The shredder as defined in claim 15 together with a second pump supplying hydraulic fluid to the hydraulic motors driving the rollers.

* * * * *